US 6,209,078 B1

(12) United States Patent
Chiang et al.

(10) Patent No.: US 6,209,078 B1
(45) Date of Patent: Mar. 27, 2001

(54) ACCELERATED MULTIMEDIA PROCESSOR

(75) Inventors: Paul Chiang, Richardson; Pius Ng, Plano; Paul Look, Richardson, all of TX (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/276,262

(22) Filed: Mar. 25, 1999

(51) Int. Cl.$^7$ .................................................. G06F 17/00
(52) U.S. Cl. ............................................. 712/36; 345/505
(58) Field of Search ........................... 712/36, 203, 205; 345/503, 505

(56) References Cited

U.S. PATENT DOCUMENTS

| 5,377,182 | * | 12/1994 | Monacos | 370/16 |
| 5,677,913 | * | 10/1997 | Aybay | 371/21.3 |
| 5,968,167 | * | 10/1999 | Whittaker | 712/225 |
| 6,058,465 | * | 5/2000 | Nguyen | 712/23 |
| 6,094,715 | * | 7/2000 | Wilkinson | 712/20 |

* cited by examiner

Primary Examiner—Eric Coleman
(74) Attorney, Agent, or Firm—Conley, Rose & Tayon, PC; B. Noel Kivlin

(57) ABSTRACT

A programmable multimedia accelerator which maximizes data bandwidth utilization with minimal hardware (and consequently minimal power consumption) is provided herein. In one embodiment, the accelerator includes four functional units, a routing unit, and a control module. The functional units each operate on four input bytes and a carry-in bit, and produce two output bytes and a carry-out bit. The carry-out bit of each functional unit is provided as a carry-in bit to another functional unit, allowing the functional units to operate cooperatively to carry out extended-precision operations when needed. The functional units can also operate individually to perform low-precision operations in parallel. The routing unit is coupled to the functional units to receive the output bytes and to provide a permutation of the output bytes as additional pairs of input bytes to the functional units. The control module stores and executes a set of instructions to provide control signals to the functional units and the routing units. The functional units are preferably configured to perform 8×8 bit multiplications and 16 bit operations such as addition, subtraction, logical AND, and logical XOR.

14 Claims, 3 Drawing Sheets

ACCELERATED MULTIMEDIA PROCESSOR

BACKGROUND OF THE INVENTION

1. Field of the Invention

This invention relates to the field of processing systems suitable for multimedia processing. More specifically, this invention relates to system having a programmable, modular, accelerated multimedia processor.

2. Description of the Related Art

Digital multimedia systems require a substantial digital signal processing capability. This requirement is shared by many other digital systems including image rendering systems, artificial vision systems, digital communication systems, and speech recognition systems. The typical architecture for such systems is shown in FIG. 1.

FIG. 1 shows a microcontroller bus 102 which couples a microcontroller 104 to a microcontroller memory 106. A digital signal processor (DSP) 108 is similarly coupled to a DSP memory 110 by a DSP bus 112. The two busses are coupled by a bus bridge 114.

This architecture is popular since the microcontroller 104 can assume the responsibility for system-level functions (such as controlling a user interface, initiating and terminating operation of various system modules, and coordinating data transfers), and the DSP 108 can assume the responsibility for computationally-intensive tasks (such as various coding and compression algorithms, filtering operations, and data transforms). This division of labor eases system design and programming.

However, this architecture is inadequate for future generations of digital multimedia systems. The processing requirements are being increased as designers take advantage of compression algorithms and higher bandwidths to transmit more information. For example, new premium services have been proposed for "Third Generation (3G) Wireless" applications. Third generation wireless refers to international standards defined by the Universal Mobile Telecommunications System (UMTS) committee and the International Mobile Telecommunications in the year 2000 (IMT-2000) group. Third generation wireless applications support bit rates from 384 KB/s to 2 Mb/S, allowing designers to provide wireless systems with multimedia capabilities, superior quality, reduced interference, and a wider coverage area.

To a small extent, the processing capacity of a DSP can be increased through the development of new algorithms and careful optimization of software. However this requires a substantial investment of time and resources, for an indeterminate payoff. A more pragmatic solution is to use a more powerful DSP.

A more powerful DSP can be created in two ways. The clock speed can be increased, but this requires careful optimization and redesign of the DSP for every incremental improvement in semiconductor processing technology. Alternatively, the DSP can be provided with wider data paths, e.g. an 8-bit DSP could be replaced with a 32-bit DSP. However, the increases in the required area and power consumption are quadratic (i.e. to double the data path width, the area and power requirements increase by approximately a factor of four). This alternative is undesirable since power consumption is a perennial design constraint, particularly in view of the increasing popularity of portable devices.

Furthermore, larger data path widths are likely to be a poor "fit" for the data granularity, leading to inefficient use of the more powerful DSPs. For example, MPEG video compression operates with 8-bit blocks of video data. Even if multiple blocks were retrieved at a time, the DSP could only perform (at most) one 8-bit block operation per clock cycle. The rest of the data path width is unused for these operations.

To address these problems, this architecture may be modified by the addition of a dedicated, hardwired (non-programmable) accelerator that is custom-designed to efficiently and quickly carry out specific algorithms. The accelerator may be coupled to the DSP 108 and the DSP memory 110 via the DSP bus 112. The DSP 108 then performs the less demanding computationally-intensive tasks of pre-processing and post-processing the data, and allows the accelerator to perform the processing steps that the DSP 108 is too inefficient to perform.

Most hardwired accelerators are tightly coupled to the DSP as an integral part of the system. It is often difficult to integrate such accelerators into other systems without significant modification.

Further, while fast and efficient, hardwired accelerators are optimized for specific tasks. Multiple tasks would require multiple accelerators. This represents an undesirable cost (in terms of area and power consumption) for next generation multimedia systems which may be expected to perform a wide variety of multimedia processing tasks. For example, the 3G wireless communications system may require support for echo cancellation, voice recognition, high-quality sound and graphics generation, audio and video compression, error correction coding, data encryption and scrambling, and transmit signal modulation and filtering. Support for demodulation, descrambling, decryption, decoding, and decompression would also be required for received signals. A programmable multimedia accelerator optimized for these operations would provide a desirable alternative to an expensive, high-performance DSP or a large collection of hardwired accelerators.

SUMMARY OF THE INVENTION

Accordingly, a programmable multimedia accelerator which maximizes data bandwidth utilization with minimal hardware (and consequently minimal power consumption) is provided herein. In one embodiment, the accelerator includes four functional units, a routing unit, and a control module. The functional units each operate on four input bytes and a carry-in bit, and produce two output bytes and a carry-out bit. The carry-out bit of each functional unit is provided as a carry-in bit to another functional unit, allowing the functional units to operate cooperatively to carry out extended-precision operations when needed. The functional units can also operate individually to perform low-precision operations in parallel. The routing unit is coupled to the functional units to receive the output bytes and to provide a permutation of the output bytes as input bytes to the functional units. The control module stores and executes a set of instructions to provide control signals to the functional units and the routing unit. The functional units are preferably configured to perform 8×8 bit multiplications and 16 bit operations such as addition, subtraction, logical AND, and logical XOR.

BRIEF DESCRIPTION OF THE DRAWINGS

A better understanding of the present invention can be obtained when the following detailed description of the preferred embodiment is considered in conjunction with the following drawings, in which.

Figure 1:
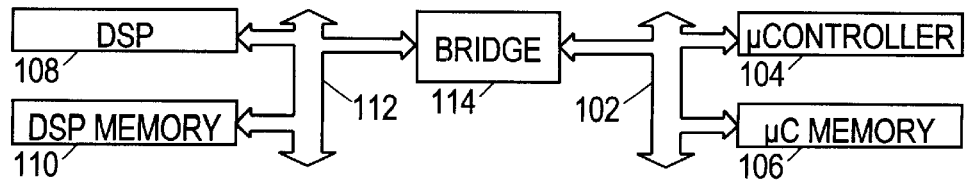
FIG. 1 shows a conventional system architecture for a multimedia device with a digital signal processing subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
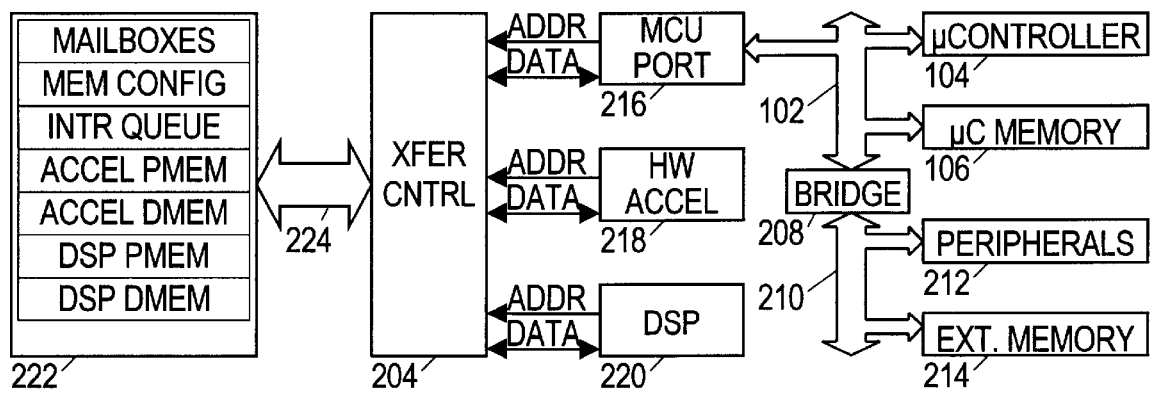
FIG. 2 is shows a preferred system architecture for employing the present invention.

FIG. 2 shows a functional block diagram of a system in which the present hardware accelerator could illustratively be employed. The system includes a microcontroller bus 102 which couples a microcontroller unit 104 to a microcontroller memory 106 and a bus bridge 208. Bus bridge 208 couples microcontroller bus 102 to a peripheral bus 210, whereby the microcontroller 104 can access peripheral devices 212 and extended memory 214. Peripheral devices 212 preferably provide an interface to the external environment whereby the microcontroller unit 104 can obtain input data and instructions and can provide output results. Extended memory 214 preferably provides long term program and data storage when the system is powered down.

Coupled to the microcontroller bus 102 is a microcontroller unit (MCU) port 216, whereby the microcontroller 104 may communicate with the numerical processing subsystem. A transfer controller 204 is coupled to the MCU port 216 and various special purpose processors such as a hardware accelerator 218 and a digital signal processor (DSP) 220. Transfer controller 204 coordinates data transfers between the array of processors (including the microcontroller 104 via MCU port 216) and a logically-mapped shared memory 222 via data path 224. Transfer controller 204 handles memory-to-memory, memory-to-processor, processor-to-memory, and processor-to-processor data transfers.

Shared memory block 222 represents the logical map of the memory address space as it appears to the processors. The shared memory is preferably used to store program instructions (PMEM) and data (DMEM) for each of the processors, as well as mailbox information (for inter-processor communication), memory configuration information, and interrupt queue information. The memory is preferably divided into pages, with ownership, reading, writing, and execution privileges of each processor for each page being assigned in the memory configuration information. Subject to these programmed privileges, the transfer controller 204 allows every processor to read or write from any of the memory pages. The transfer controller 204 maintains a list of page pointers, one for each processor. The individual processors gain access to the various memory pages by setting their page pointers accordingly. The transfer controller 204 treats subsequently generated addresses as offsets from the page pointer. One exception to this is that the first memory page (which includes the page pointers and other memory configuration information) is always accessible to each of the processors. Consequently, certain addresses generated by the processors always refer to the first memory page, regardless of the page pointer setting.

It is noted that logically-mapped shared memory 222 and data path 224 are conceptual representations provided for explanatory purposes, and are not necessarily present as physical circuits in an implemented system. Rather, the shared memory 222 is preferably implemented partially as registers (e.g. for memory configuration) and partially as separate, strategically placed memory modules of various sizes. Data path 224 preferably comprises a plurality of uniform-width address and data busses which can be dynamically configured to operate cooperatively as one or more memory busses of various sizes as needed.

In a preferred embodiment, the program instructions for each of the processor units are kept in memory 222. In an alternate embodiment, the program instructions may be kept in dedicated memories coupled directly to the processor units. Other embodiments exist which employ some combination of this.

The hardware accelerator is preferably fast and programmable, and preferably requires minimal hardware and power. To achieve these features, the hardware accelerator is provided with multiple functional units which operate on data paths of a predetermined width. The units are able to operate in parallel for small precision operations, and they are able to work together for high precision operations. The precision is variable in a range between the precision of a single functional unit and the precision the combined functional units. Further, the precision can be varied from one cycle to the next as the functional units are used independently or in an interdependent fashion, as needed. It is contemplated, for example, that the hardware accelerator could be configured to simultaneously perform 4 independent 16-bit calculations in one cycle, and then be reconfigured to simultaneously perform a 24-bit calculation and an 8-bit calculation in the next cycle. This flexibility allows the hardware accelerator to make full use of the data bandwidth even when only small-precision operations are required. Accordingly, the hardware requirements and power consumption are minimized.

Figure 3:
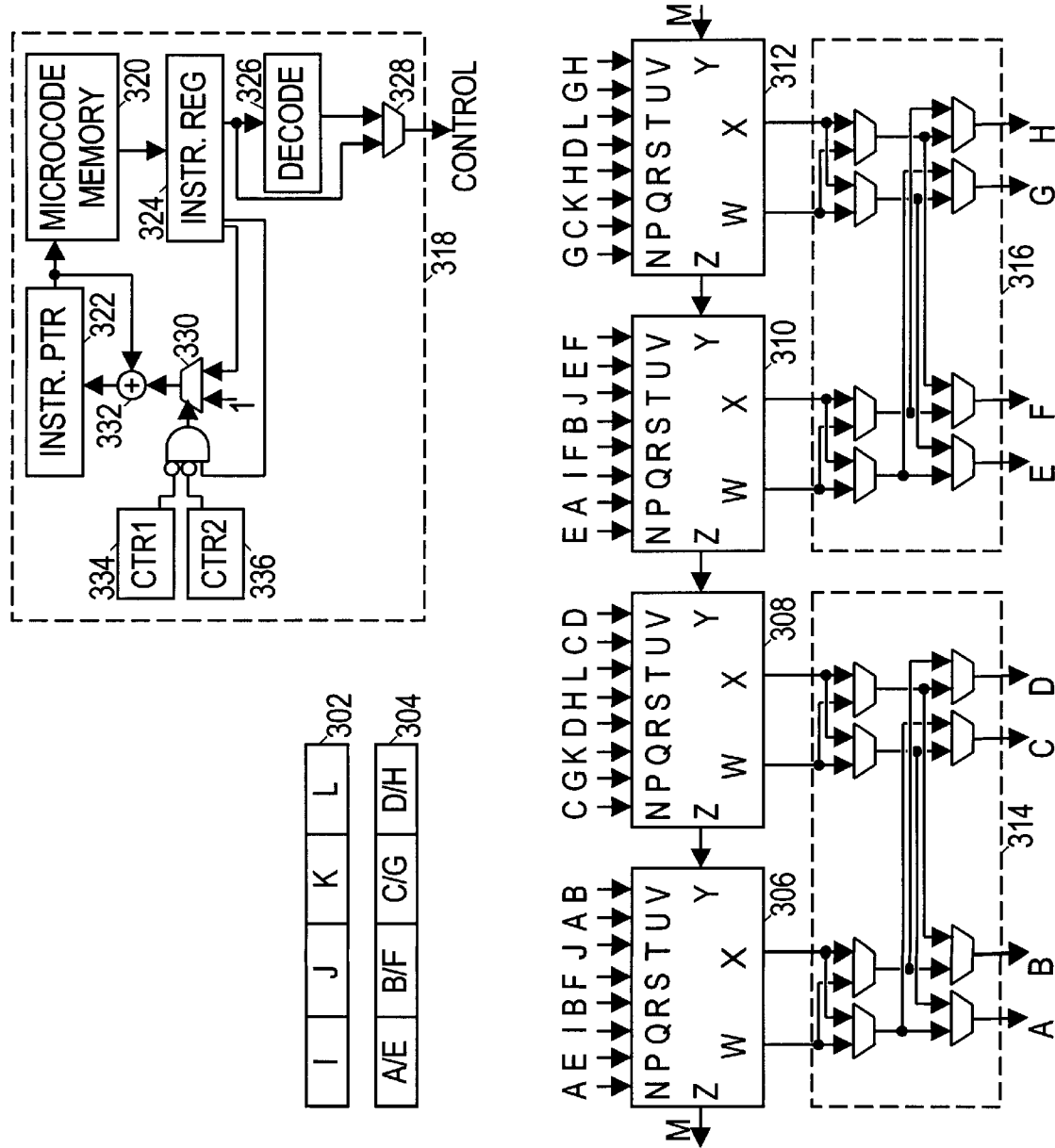
FIG. 3 is a functional block diagram of a hardware accelerator embodiment according to the present invention.

FIG. 3 shows a functional block diagram of one embodiment of a hardware accelerator. The hardware accelerator includes an input latch 302, an output latch 304, a group of identical functional modules 306, 308, 310, 312, two routing modules 314, 316, and a control module 318. The input and output latches 302, 304 are part of a standardized, memory-type interface. With this standardized interface, the hardware accelerator can be easily incorporated into other systems with little or no modification.

Figure 4:
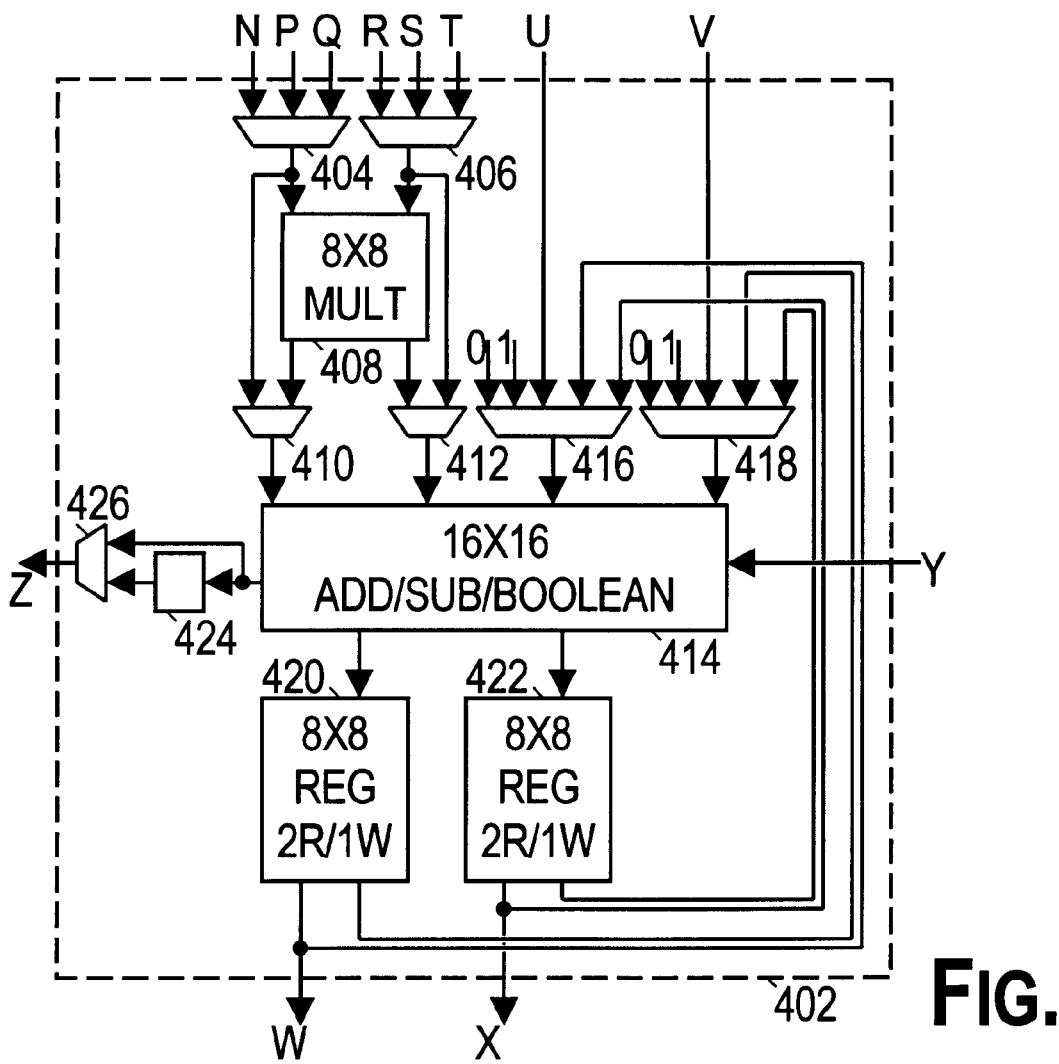
FIG. 4 is a functional block diagram of a functional unit embodiment.

One embodiment of functional modules 306, 308, 310, 312 is shown in detail in FIG. 4. Functional module 402 includes input multiplexers 404, 406, 416, 418, a multiplier 408, bypass multiplexer 410, 412, an arithmetic logic unit 414, register banks 420, 422, a carry latch 424, and a latch bypass multiplexer 426. The functional module input and output signals are labeled N–Z for reference between FIGS. 3 and 4.

Input multiplexers 404, 406 select an input byte from the input latch 302, from routing module 314, or from routing module 316. Input multiplexers 416, 418 select an input byte that is: (a) all zeros; (b) all ones; (c) all zero except for a carry bit; (d) from the register banks 420 or 422; or (e) from one of the routing modules.

Input multiplexers 404, 406 are coupled to an 8×8 bit multiplier 408, which multiplies the input bytes to produce a 16 bit result. Bypass multiplexers 410, 412 are coupled to the multiplier's inputs and outputs, and can be set to bypass the multiplier 408.

A 16-bit word from bypass multiplexers 410, 412 and a 16-bit word from the input multiplexers 416, 418 are provided to ALU 414. ALU 414 combines the two 16-bit words with a carry-in bit (Y) to produce a 16-bit result, which is written to register banks 420, 422, and a carry bit, which is provided to carry latch 424. ALU can preferably perform addition, subtraction, bitwise XOR, bitwise AND, and other logical operations such as NOT, OR, and shifting. Latch bypass multiplexer 426 is coupled to the input and output of carry latch 424, and can be set to bypass the carry latch. Preferably, the latched carry bit can be used to control input operand selection for the next cycle.

Register banks 420, 422 are preferably one byte wide and eight bytes deep, randomly accessible, and provided with one write port and two read ports. The read ports on each register bank are coupled to a corresponding input multiplexer 416, 418, and one of the read ports from each register provides an output byte from the functional unit. Preferably the other read port is also coupled to the input multiplexers 416, 418 as a control signal to provide for conditional selection of input bytes.

Functional module 402 can be operated as a standalone unit or as a member of a cascaded configuration. As a standalone unit, functional module 402 can operate as an 8×8 multiply-and-accumulate (MAC) unit, or as a standalone 16-bit ALU. Other embodiments are also contemplated which employ different precision operations for the functional module.

Referring again to FIG. 3, the four functional modules can be cascaded to provide greater precision for operations requiring more computational capacity. The functional modules are organized as two clusters, with each cluster having a routing module that provides for exchange of data between the functional modules within the cluster. Each functional module also includes input multiplexers 404, 406 coupled to both routing modules to provide for data exchange between the two clusters. The routing modules and input multiplexers are expected to eliminate the need for any complex addressing methods or special addressing units as are normally required in hardwired accelerators for implementing the discrete cosine transform (DCT).

The routing modules 314, 316 each comprise a set of multiplexers in a "baseline network" configuration. This baseline network will provide 8 of the 16 possible permutations from four inputs to four outputs that a complete crossbar can implement, as well as various "broadcast" configurations in which a single input is provided to multiple outputs. The permutations which are not provided are unusual permutations which are rarely useful in most coding and transform operations.

Control module 318 includes a microcode memory 320, an instruction pointer 322, an instruction register 324, an instruction decoder 326, a decoder bypass multiplexer 328, an increment multiplexer 330, an adder 332, and a first and second counter 334, 336. Instruction pointer 322 provides an instruction address to microcode memory 320, which in turn provides a microcode instruction to instruction register 324. When control module 318 is operating in an instruction mode, the contents of the instruction register are decoded by decoder 326 into control signals. However, when control module 318 is operating in a microcode mode, the decoder 326 is bypassed by multiplexer 328, and the contents of the instruction register are provided on the control lines. The control lines are coupled to all the latches and multiplexers in the accelerator to determine the operations for that cycle.

The contents of instruction register 324 may include a jump offset and an asserted jump control bit. These are provided to increment multiplexer 330. Increment multiplexer 330 provides a '1' or the jump offset to adder 332, which adds the increment value to the instruction pointer 322. Unconditional jumps therefore result in an immediate update of the instruction pointer. Counters 334 and 336 are provided for looping. They can each be loaded and periodically decremented by control signals from the instruction register, and they are each provided with a zero-detect unit. The zero-detect units can each inhibit the jump bit to force an exit from a loop. The counters 334, 336 are preferably 5-bit counters. Two counters are provided to support nested loops (to one nesting level) and two-dimensional data.

In microcode mode, multiple words from the microcode memory 320 directly control the accelerator 218 without decoding logic 326. In instruction mode, words in memory 320 each have a single instruction which is decoded by decoding logic 326 to provide all the necessary control signals. Use of the two methods of operation can preferably be interleaved as desired by the programmer. The instruction mode advantageously requires less memory for storing the instructions, while microcode mode advantageously provides increased versatility through direct control of the individual control lines.

Algorithms are hereby described for employing the four functional units 306, 308, 310, 312 to implement calculations of various precisions. Many audio/video applications use an unconventional precision for their calculations, and use of a standard precision (e.g. 16×16, 32×32) would result in wasted power consumption.

9×14 Multiply

Multiplication of 14 bit multiplier with a 9 bit multiplicand to produce a 23-bit product is a common operation in video processing. This operation can be performed in two cycles by a single functional unit. Referring to FIG. 4, assume that the 14 bit multiplier is stored in two bytes A B in register bank 420, and that the 9 bit multiplicand is stored in two bytes C D in register bank 422. In the first cycle, register bank 420 puts out byte B on line W, and register bank 422 provides byte D on line X and provides byte C as a control signal (not shown) to multiplexer 416. The following calculation is made in one cycle:

$$P1 = B*D + ((C_{1sb}=1)?(B<<8):0)$$

The shift operation is equivalent to providing the byte B as the most significant byte to multiplexer 416. The conditional operation is determined by the switching operation of multiplexer 416. If the least significant bit of byte C is 1, then multiplexer 416 selects byte B. Otherwise, the multiplexer selects the all zero input. The multiplication is performed by the multiplier 408, and the addition is performed by the ALU 414. The 16-bit result is written as most-significant byte P1h to register bank 420 and a least significant byte P1L to register bank 422. A carry bit $c_{P1}$ is latched by carry latch 424.

In the second cycle, register bank 420 puts out byte A on line W and provides byte P1h to multiplexer 418. Register bank 422 provides byte D on line X and provides byte C as a control signal (not shown) to multiplexer 416. The following calculation is then performed:

$$P2 = A*D + ((C_{1sb}=1)?(A<<8)\&P1h:P1h) + c_{P1}$$

and the 16-bit result is stored as a byte in each of the register banks. The & denotes the concatenation of the outputs of multiplexers 416 and 418 to form a 16 bit operand. The 23-bit product is contained in the three bytes (most significant to least significant) P2 P1L. If each of the functional units is performing the above operation, four 9×14 bit multiplications can be completed every two cycles.

16×16 Multiply

Along similar lines, a single functional unit can perform a 16×16 bit multiplication in four cycles using the following operations (assuming multiplier is A B, and multiplicand is C D):

Cycle 1: $P1=B*D$

Cycle 2: $P2=A*D+P1h$

Cycle 3: $P3=B*C+P2$

Cycle 4: $P4=A*C+(0000000_{Cp3})\&P3$

The result is then contained in the four bytes P4 P3L P1L. $c_{p3}$ is the carry bit from the P3 calculation, P1h and P3h are the high bytes of P1 and P3, respectively, and P1L and P3L are the low bytes. If each of the functional units is performing the above operations, four 16×16 bit multiplications can be completed every four cycles.

24×24 Multiply

The functional units can operate cooperatively to perform a 24×24 bit multiplication in the following manner (assuming multiplier is A B C, and multiplicand is D E F):

|  | Unit#1 | Unit#2 | Unit#3 |
|---|---|---|---|
| Cycle 1: | P1 = C * F | P2 = C * E | P3 = C * D |
| Cycle 2: | P4 = B * F + P1h | P5 = B * E + P2h | P6 = B * D + P3h |
| Cycle 3: | P7 = A * F + P4h | P8 = A * E + P5h | P9 = A * D + P6h |
| Cycle 4: | P10=(P8L <<8) + P7 | P11= P9 + P8h + $c_{P10}$ |  |

The result is then contained in the six bytes P11 P10 P4L P1L. Consequently, three of the functional units can complete a 24×24 bit multiplication every four cycles. The fourth functional unit is free for other operations, such as a 16×16 bit multiply.

32×32 Multiply

The functional units can operate cooperatively to perform a 32×32 bit multiplication in the following manner (assuming multiplier is A B C D and multiplicand is E F G H):

| Cycle | Unit#1 | Unit #2 | Unit #3 | Unit #4 |
|---|---|---|---|---|
| 1: | P1=D*H | P2=D*G | P3=D*F | P4=D*E |
| 2: | P5=C*H+P2 | P6=C*G+P3 | P7=C*F+P4 | P8=C*E |
| 3: | P9=B*H+P6 | P10=B*G+P7+$c_{P5}$ | P11=B*F+P8+$c_{P6}$ | P12=B*E+$c_{P7}$ |
| 4: | P13=A*H+P10 | P14=A*G+P11+$c_{P9}$ | P15=A*F+P12+$c_{P10}$ | P16=A*E+$c_{P11}$ |
| 5: |  | P17=P15+$c_{P13}$ | P18=P16+(0000000$c_{P15}$&0000000$c_{P14}$) |  |
| 6: | P19=(P5L<<8)+P1 | P20=P9+(P13L&P5h)+$c_{P19}$ | P21=P14+(P17L&P13h)+$c_{P20}$ | P22=P18+P15h+$c_{P21}$ |

The result is then contained in the eight bytes P22 P21 P20 P19. Consequently, the four functional units can complete a 32×32 bit multiplication every six cycles.

Although the embodiment illustrated only includes four functional modules, other embodiments with a greater or lesser number of functional modules may be used. The functional units have short critical paths that allow speed-up of the accelerator. In other words the functional units can be clocked at a higher rate to provide better performance. The control hardware is also very simple, in part due to the allowance of only unconditional branching.

The use of multiple identical modules simplifies the hardware design and implementation. The use of cascadeable, low-complexity functional units shortens the critical paths and thereby allows the accelerator design to easily ride the technology curve, i.e. little or no redesign is required to implement the hardware accelerator with new technologies as they evolve. The longest critical path in this design occurs through the carry bits when all of the functional units are being used to perform a maximum precision addition (64 bits for the embodiment of FIG. 3). Higher clock speeds will not impair the functionality of an accelerator having this design. This is not true of digital signal processors having increased data path widths. There, the longest critical path occurs in the multiplication.

In addition to being fast, the disclosed hardware accelerator is programmable. A variety of multimedia functions can be accelerated by this embodiment. Software for the individual functions required by the system can be stored in memory and invoked as needed. For example, software routines for MPEG video compression functions (quantization, motion estimation, discrete cosine transform, inverse transform, motion compensation, de-quantization), scrambling/descrambling, audio compression, error correction coding/decoding, echo cancellation, speech recognition, and more, can be authored and provided to system designers. This approach is expected to reduce system design time.

As an advantage of the ability to scale the system, various system implementations may be designed with various numbers of functional units and/or additional hardware accelerators to provide a customer with a customized cost/performance tradeoff.

What is claimed is:

1. A hardware accelerator which comprises:
   an input port; and
   two or more functional units, wherein each functional unit includes:
   a first input multiplexer coupled to the input port to receive an first N bit word;
   a second input multiplexer coupled to the input port to receive a second N bit word different than the first N bit word;
   a third input multiplexer;
   a fourth input multiplexer;
   an N×N bit multiplier coupled to the first and second input multiplexers to receive the first and second N bit words and configured to multiply the first and second N bit words to produce a most significant N bit word and a least significant N bit word;
   a first bypass multiplexer coupled to the multiplier to receive the most significant N bit word and coupled to the first input multiplexer to receive the first N bit word, and further configured to provide a first selected N bit word;
   a second bypass multiplexer coupled to the multiplier to receive the least significant N bit word and coupled to the second input multiplexer to receive the second N bit word, and further configured to provide a second selected N bit word;
   a 2N bit arithmetic logic unit (ALU) coupled to the first and second bypass multiplexers to receive a first 2N bit operand, and coupled to the third and fourth input multiplexers to receive a second 2N bit operand, wherein the ALU is configured to operate on the first and second 2N bit operands to produce a most significant N bit result word and a least significant N bit result word;

a first register bank coupled to the ALU to receive the most significant N bit result word, and configured to provide a third N bit word to the third input multiplexer and a fourth input word to the fourth multiplexer; and a second register bank coupled to the ALU to receive the least significant N bit result word, and configured to provide a fifth N bit word to the third input multiplexer and a sixth N bit word to the fourth input multiplexer.

2. The hardware accelerator of claim 1, wherein the ALU is also configured to generate a carry bit, and wherein each functional unit further comprises:

a carry bit latch coupled to the ALU to receive and hold the carry bit;

a third bypass multiplexer coupled to the ALU to receive a current carry bit and coupled to the carry bit latch to receive a previous carry bit, wherein the third bypass multiplexer is configured to provide a selected carry bit to an ALU of another functional unit.

3. The hardware accelerator of claim 1, wherein the first, second, third, and fourth multiplexers of each functional unit are each coupled to another functional unit to receive an N bit word from a register bank of the other functional unit.

4. The hardware accelerator of claim 1, further comprising a first routing unit coupled to a first plurality of functional units and a second routing unit coupled to a second plurality of functional units, wherein the routing units are configured to receive an N-bit word from each of the register banks in the corresponding plurality of functional units, and wherein the routing units are each configured to provide a permutation of the received N-bit words to each plurality of functional units.

5. The hardware accelerator of claim 4, wherein the first and second input multiplexers are each coupled to both routing units, and wherein the first and second input multiplexers are configured to select between N-bit words provided by the input port, the first routing unit, and the second routing unit.

6. The hardware accelerator of claim 5, wherein the third and fourth input multiplexers are each coupled to a single routing unit, and where the third and fourth input multiplexers are each configured to select between an all-zero N-bit word, an otherwise all-zero N-bit word with a carry bit, an all-one N-bit word, an N-bit word from the first register, an N-bit word from the second register, and an N-bit word from the routing unit.

7. The hardware accelerator of claim 5, wherein N=8.

8. The hardware accelerator of claim 5, wherein the hardware accelerator includes four functional units.

9. The hardware accelerator of claim 1, wherein the ALU is configured to perform operations including addition, subtraction, logical AND, and logical XOR.

10. The hardware accelerator of claim 1, further comprising a control module that includes:

an instruction pointer register;

an instruction memory coupled to receive an instruction address from the instruction pointer register and configured to responsively provide an instruction;

an instruction register coupled to the instruction memory to receive and hold an instruction, wherein the instruction register is coupled to control lines to control the operation of the input multiplexers, bypass multiplexers, and ALU.

11. A programmable processor which comprises:

a number M of functional units, wherein each functional unit is configured to operate on four N-bit input words and a carry-in bit, and is configured to provide two N-bit output words and a carry-out bit, wherein the carry-out bit of each functional unit is provided to another functional unit as the carry-in bit;

a routing unit coupled to receive the two N-bit output words from each of the M functional units, and configured to provide a permutation of the N-bit output words as the N-bit input words to the functional units; and a control module configured to store a set of instructions and configured to index through the instructions to provide control signals to the functional units and the routing unit.

12. The programmable processor of claim 11, wherein the functional units are each configured to perform an N×N bit multiplication and a selectable one of a set of 2N bit ALU operations, wherein the set of 2N bit ALU operations includes addition, subtraction, logical AND, and logical XOR.

13. The programmable processor of claim 12, wherein the control module is configured to cause the functional units to operate cooperatively to implement multiplications with an operand greater than N bits, and to implement ALU operations with operands greater than 2N bits.

14. A method for achieving maximum data bandwidth utilization with minimum accelerator hardware, wherein the method comprises:

splitting an N-bit input data word into a plurality of disjoint M-bit input words;

providing a pair of M-bit input words to each of a plurality of functional units;

performing operation from a set of operations on the pairs of M-bit words to produce a pair of M bit output words from each of the functional units, wherein the set of operations includes M×M bit multiply, 2M bit addition, and 2M bit logical XOR;

routing the M-bit output words from the functional units to provide a permutation of the M-bit output words as pairs of input words to each of the functional units.

* * * * *